May 17, 1960 M. KASSEL 2,936,956

ELECTRONIC COMPUTER

Filed Oct. 11, 1955 6 Sheets-Sheet 1

INVENTOR.
Martin Kassel
BY
Michael S. Striker
Attorney

INVENTOR.
Martin Kassel
BY
Michael S. Striker
Attorney

May 17, 1960 M. KASSEL 2,936,956

ELECTRONIC COMPUTER

Filed Oct. 11, 1955 6 Sheets-Sheet 3

INVENTOR.
Martin Kassel
BY
Michael S. Striker
Attorney

May 17, 1960 M. KASSEL 2,936,956

ELECTRONIC COMPUTER

Filed Oct. 11, 1955 6 Sheets-Sheet 4

INVENTOR.

Martin Kassel

BY Michael S. Striker

Attorney

May 17, 1960 M. KASSEL 2,936,956

ELECTRONIC COMPUTER

Filed Oct. 11, 1955 6 Sheets-Sheet 5

INVENTOR.
Martin Kassel

BY
Michael S. Striker
Attorney

May 17, 1960 M. KASSEL 2,936,956

ELECTRONIC COMPUTER

Filed Oct. 11, 1955 6 Sheets-Sheet 6

INVENTOR.
Martin Kassel

BY Michael S. Striker
Attorney

United States Patent Office 2,936,956

Patented May 17, 1960

2,936,956

ELECTRONIC COMPUTER

Martin Kassel, Berlin-Charlottenburg, Germany, assignor to Kienzle Apparate G.m.b.H., Villingen/Schwarzwald, Germany Application October 11, 1955, Serial No. 539,879

Claims priority, application Germany October 11, 1954

17 Claims. (Cl. 235—160)

Numerous mechanical, electromechanical and electronic calculators for addition, subtraction, multiplication and division are known. They usually perform multiplication and division in the form of repeated addition and subtraction. As a rule, electronic computers preferentially employ the dual or binary number system, because electronic elements having two stable conditions were at first the only ones available. However, such computers have the serious disadvantage that at the input and output, common decimal numerals must be converted to the binary system and vice versa. Some multiplication and division devices use decimal computation, but the individual components are nevertheless binary, though assembled into decimal groups. Computers with genuine decimal computation require true decimal components. Such components have recently become known in the form of electron tubes and cold-cathode tubes having ten discrete stable conditions in two amplitude levels, and they have been used in design of decimal calculators, especially multipliers and dividers. Yet the complexity of multiplying and dividing circuits is still fairly great, since all operands require to be pre-set in counter or storage chains fitted with such special tubes before multiplication or division of such stored numerical data by repeated addition or complement addition (subtraction) can proceed.

The invention relates to a preferably decimal electronic computer substantially simplifying the material requirements for electronic calculating operations. Since moreover, as will be explained below, the complement of a number is formed without difficulty, the invention makes possible the construction of a four-operation calculator, including division.

In application of the known fact that an electron beam sweeping over a plurality of anodes will produce temporally successive electric impulses upon such anodes, electronic selector tubes have been developed for purposes of electronic selection techniques in which an electron beam emitted by a cathode is subjected to rotary motion by means of a system of deflector plates, thereby successively scanning a plurality of anodes.

From this point of departure, the invention comprises a method of producing groups or multiples thereof comprising a plurality of single electrical pulses, wherein one or more preferably sawtooth pulses are applied to an electronic deflector tube having several anodes, preferably ten, and the pulses generated on the anodes are supplied to a collector bar at the ends of which the pulse groups or multiples thereof are taken off. In this process, in the course of a revolution of the electron beam from one extreme position to the other, owing to the incidence of electrons on the anodes connected with the collector bar, as many relatively brief pulses are generated on the collector bar in time sequence as there are anodes scanned by the electron beam in the tube. Since a single preferably sawtooth pulse will cause a sweep of the electron beam in the tube and generate a plurality of pulses—preferably 10—on the collector bar, each pulse will multiplicatively generate a pulse group consisting of a plurality of pulses, for example ten. In order to permit derivation of different pulse groups having a selectable whole number of pulses representing a multiple of the sawtooth pulse or pulses from pulse groups so produced, the invention further proposes that the pulses generated on the anodes of the electronic deflector tube be supplied to branches of the collector line, which is divisible between the branch points by means of circuit elements that can be actuated at will, for example by means of numerical keys, and that pulse groups or multiples thereof determined by the position of the element actuated to be taken off at either end of the collector line, so that the two ends of the collector line will yield groups of pulses that may differ from each other. Thus the two sections of the collector line separated by the open switch will respectively yield the values and the complements of the numbers of pulses.

One device according to the invention comprises at least one electron beam or similar deflector tube having $p$ anodes, preferably ten, so connected to a common collector line, having preferably $p$ cut-off contacts, that the anode leads are connected between adjacent ones of the $p$ cut-off contacts. If the deflector plates of each tube are supplied with $n$ pulses, these will bring about $n$ complete deflections of the electron beam over its entire range, and $np$ output pulses will result on each anode group. By selective actuation of one of the $p$ cut-off contacts between anode leads, these are divided into two pulse sub-groups of $mn$ and $(p-m)n$ pulses per anode group, where $m$ and $n$ are the preassigned factors. In the arrangement of ten anodes per deflector tube preferably provided for decadic computation, then, we have $p=10$, $0\leqq m\leqq 9$ and $0\leqq n\leqq 9$, and $10-m=$ complement of $m$.

Multiplication with the device according to the invention is accomplished, in its simplest form, by setting the first factor (multiplicand) by opening the cut-off contact corresponding to its numerical value in the common collector line, while the number of pulses corresponding to the second factor (multiplier) to the output tube.

By analogous extension of the invention, however, the second factor is introduced not by successive manual transmission of pulses to the deflector tube hooked up to the collector line for the first factor, but in the same manner as the first factor. Accordingly, ahead of the deflector tube connected to the collector line serving to enter the first factor (multiplicand), another collector line, likewise connected to the deflector tube, is provided for entering the second factor (multiplier). Let us for the moment assume that only one of the two factors to be multiplied together need be stored, such storage merely involving the opening, and keeping open for the duration of the calculation, of one cutoff contact per digit in the multiplicand collector line. The multiplier, after entry, is immediately incorporated with the stored multiplicand. In order to fit the device hereinbefore described for multiplying factors with several places, it is elaborated according to the invention so that the first factor (multiplicand) is entered by means of aggregates each consisting of one collector line and one deflector tube and equal in number to the places in that factor, while the second factor factor (multiplier) to be entered by decimal places is entered by means of a single aggregate comprising a collector line and a deflector tube, actuation of which simultaneously advances electron-beam deflector tubes stable in a plurality of discrete positions, which shift the decimal point in the result register by means of a diode network.

Other features of the invention will appear from the following description of one embodiment thereof, represented in the accompanying drawings by way of example and not of ilimitation.

In the drawings:

Figs. 1*a*, 1*b*, and 1*c* are block diagrams jointly illustrating a multiplier apparatus according to the invention;

Figs. 1*d* and 1*e* diagrammatically illustrate certain components;

Figure 4:
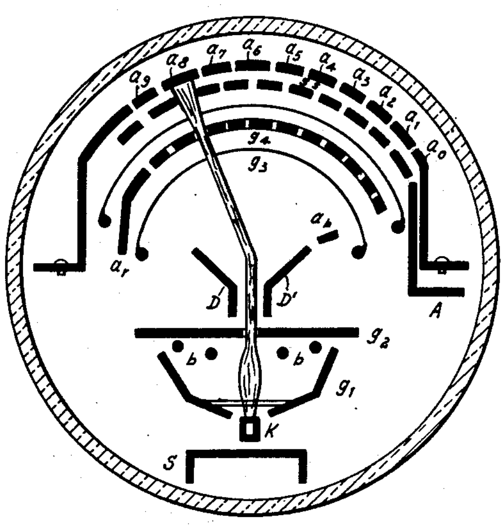
Figure 5:
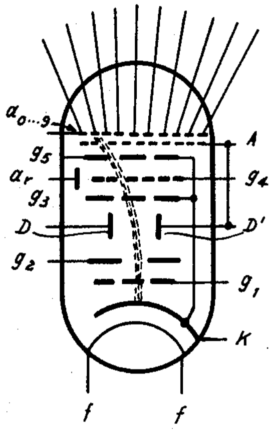

Figs. 4 and 5 respectively show a cross section and schematic diagram of an electronic step-switch tube.

Figure 1A:
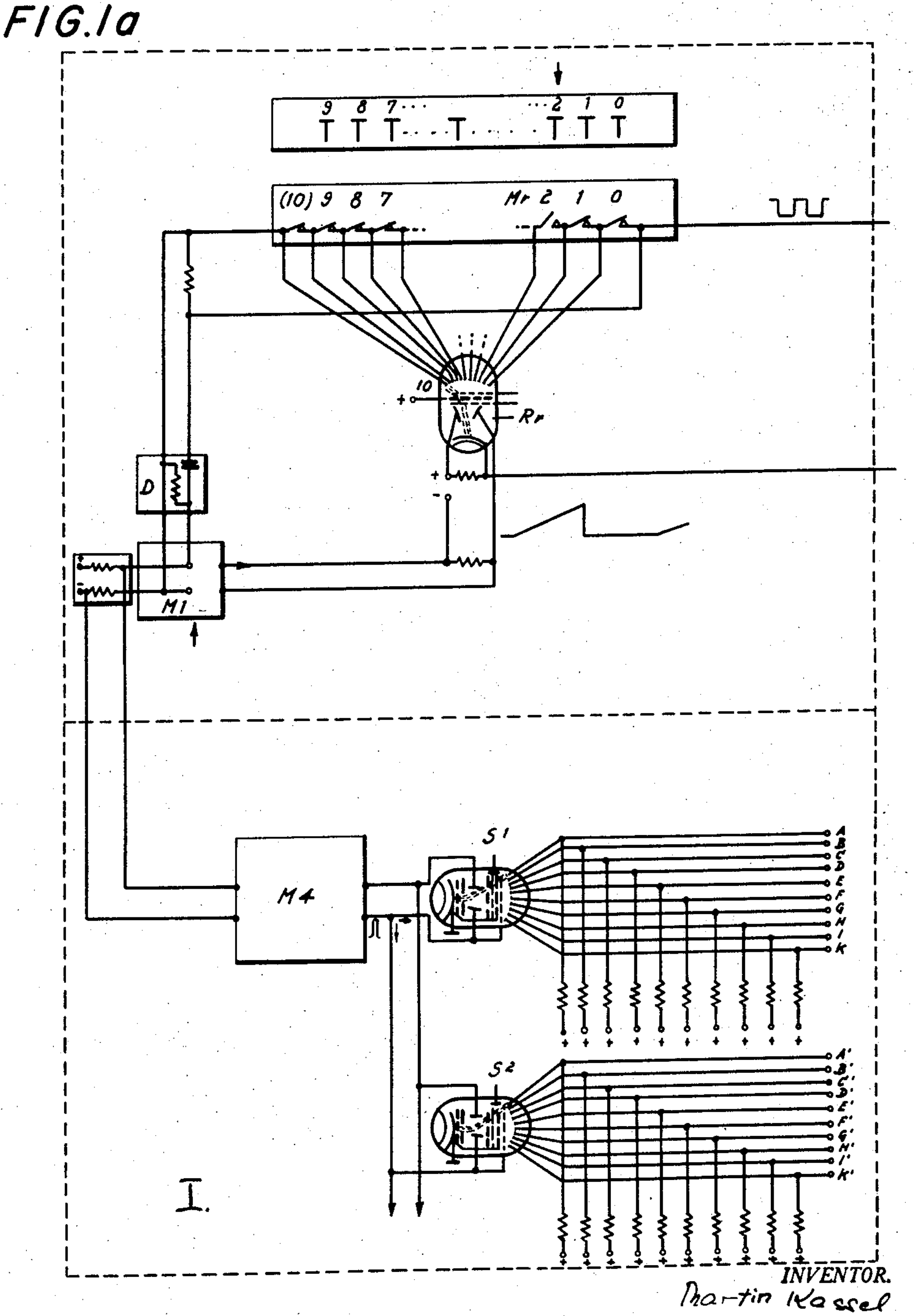
Figure 1B:
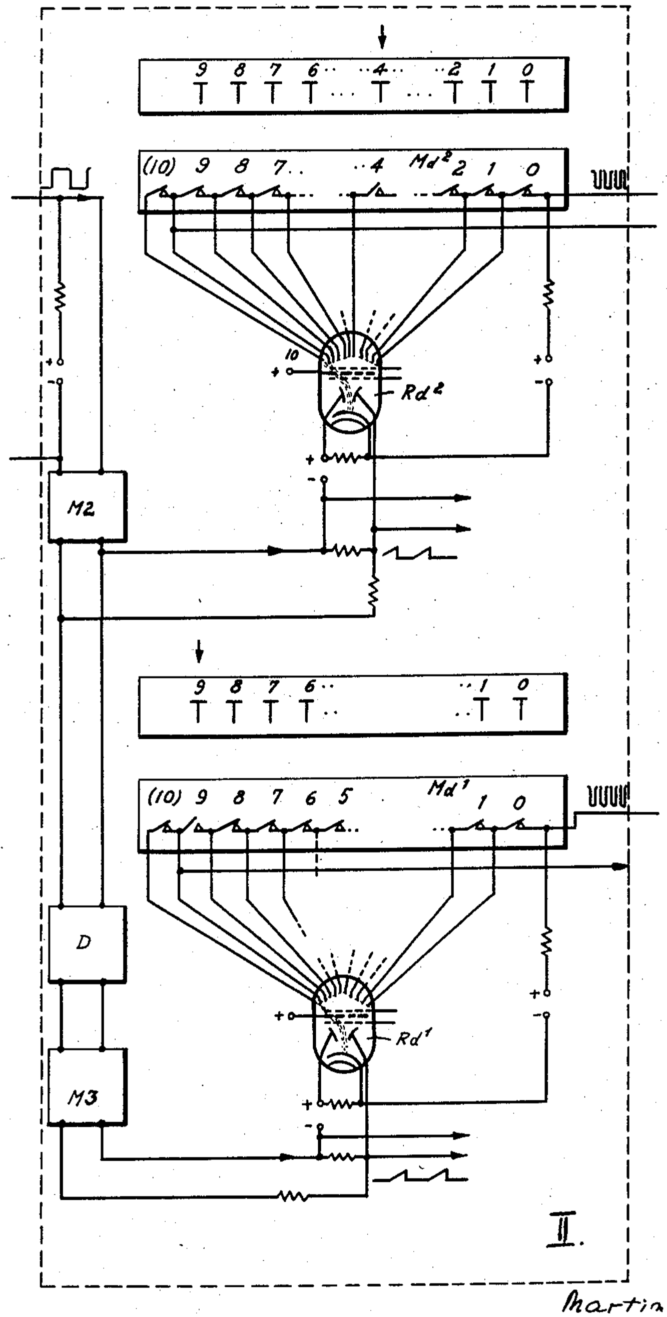
Figure 1C:
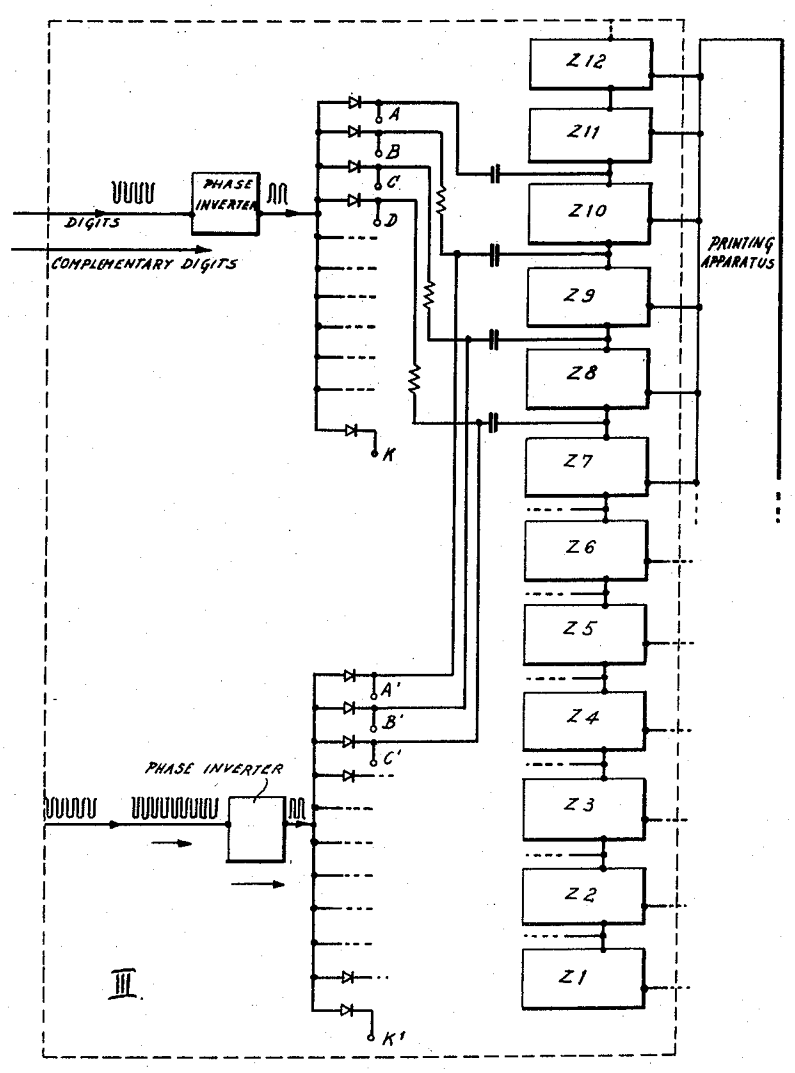

Referring to Figs. 1*a* to 1*c*, the register I for entering the multiplier decimally place-by-place is provided with only one contact bar M*r* having a number of cut-off contacts operable by means of keys and corresponding to the digits 0, 1, . . . , 9, and only one deflector tube R*r*, while the register II for entering the multiplicand has a number of contact bars $Md^1$, $Md^2$ etc. (as group elements designated $Md^n$) corresponding to the number of places, and a like number of deflector tubes $Rd^1$, $Rd^2$ etc. (as group elements designated $R^n$). Each of the collector lines or bars M*r*, $Md^1$, $Md^2$ etc. is provided with a contact between each two successive points of connection of the branches leading to the ten anodes of the electronic deflector tubes. The diagram, by way of example, shows the process of multiplying a two-place multiplicand (49) by a multiplier (for example 2) of any desired number of places which may be entered by successive keying. For each decimal place of the multiplicand, a deflector tube $Rd^n$ with preferably one rest anode and ten digital anodes (lead and contact at (10) are not here pertinent) is provided. The digital anodes are connected to ten branch points on the associated contact bar $Md^n$ fitted with ten cut-off contacts.

In the example, contact 4 of collector line $Md^2$ is open in the tens place section of the multiplicand. When the electron beam sweeps the corresponding deflector tube $Rd^2$, in response to a single saw tooth pulse supplied to the two deflector plates, over all ten of its anodes, then the collector line $Md^2$ will separately receive 4 and 6 pulses in time sequence, deriving from the four and six anodes respectively connected to the collector line (operand and complement) on the right and left of the open switch 4 (in the drawing). In the example chosen in the diagram, the collector line $Md^1$ provided for the next lower place of the multiplicand has its cut-off 9 open, so that it receives nine pulses on the right of the open switch 9 if the electron beam of the corresponding deflector tube $Rd^1$ for this place rotates once due to a single sawtooth pulse transmitted to the deflector plates, scanning all of the anodes.

The pulse groups generated in the various multiplicand levels are processed in the several counters Z1 to Z12 of a result register III. This is accomplished for example by transmittal of pulse groups from contact bars $Md^n$ place-by-place to counter tubes. In the numerical example chosen, the pulse groups of four and nine pulses arriving respectively and representing the tens and units digits of the entered multiplicand 49 (the diode combinations at the inputs of the result register and the manner of routing the pulse groups via the proper uppermost diode marked A or A′ will be described later) are supplied to the inputs of two adjacent counters, for example Z11 and Z10. Hence if the electron beams of deflector tubes $Rd^1$ and $Rd^2$ of the tens and units digits of the multiplicand, set in the example to digits 4 and 9, i.e. to the number 49, are swept by a single sawtooth pulse on the deflector plate systems from the extreme lefthand to the extreme right-hand position of the beam, then the result register III will count the number 49 once, as the result of multiplying the entered multiplicand 49 by the number 1, and store it. If the electron beams are deflected *n* times by *n* sawtooth pulses transmitted to the deflector plate systems of the multiplicand tubes (decimally, $0 \leqslant n \leqslant 9$), then *n*-fold addition of the pulse groups arriving from the multiplicand tubes and entered in the collector lines $Md^n$ will result in multiplication of the entered digits in the several decimal places of the multiplicand by *n*, and the multiplied pulse groups, in the example, are decimally accumulated in the result register III, in that case consisting of decimal counter tubes Z1 to Z12. Instead of decimal counter tubes, the result register may alternatively consist of counter chains of flip-flop tubes, transistors, ferrite elements, cold-cathode step tubes, relay chains and the like.

In this embodiment, the number *n* of saw tooth pulses effecting deflection of electron beams in the multiplicand tubes $Rd^n$ are produced in a multiplier contact bar M*r* pertaining to the multiplier system and connected to a tube R*r*. In the example shown, cut-off contact 2 is open. A single sawtooth pulse on the deflector plates of the multiplier tube R*r* will thus generate two pulses at the output of the contact bar M*r*, which, when passed on to the deflector plate system of multiplicand tubes $Rd^1$, $Rd^2$, cause the electron beams in these tubes to sweep *n* times (i.e. twice in this example), thus effecting multiplication of the number entered in the multiplicand system by *n*-fold reproduction (in this case: two-fold) of the pulse groups generated in the multiplicand.

The sawtooth pulse in the deflector system of the multiplier tube R*r* is generated by actuation of one of the multiplier contacts, i.e. division of the collector bar M*r* at any point, so as to control a mono-stable multivibrator whose sawtooth output potential is applied to the deflector plates of a multiplier tube R*r*. In order to avoid parasite pulses due to contact recoil, it is desirable to provide an accumulating circuit in the control line behind the mechanical contact.

Now if provision is made so that, when several-place multipliers are entered, the requisite decimal place shifts in the result register can be effected between actuations of the cut-off contacts of the multiplier contact bar M*r*, then, as will be apparent, repeated successive actuation of the cut-off contacts of the multiplier bar M*r* will serve to multiply the multiplicand by a multiplier having any desired number of places.

Figure 1D:
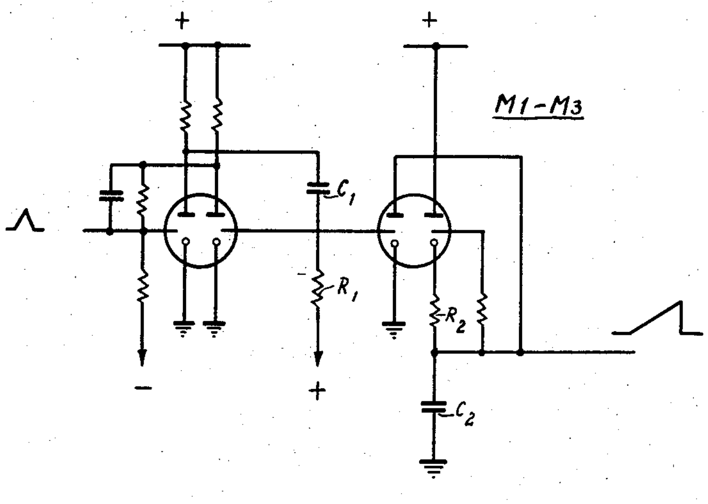

Before the decimal shift is described in detail, the relationships between deflection times of electron beams in the multiplicand tubes $Rd^n$ and deflection time of the electron beam in the multiplier tube R*r* will be explained. It is important in this connection also to ensure correct time sequence of deflection operations in the several place sections of the multiplicand system II, since it is necessary as far as possible to avoid simultaneous occurrence of two counter pulses anywhere (in any place) in the result register, namely one direct from the calculator and one additionally carried forward from a lower place of the result register. The arrangement made for example may be such that first all odd places and then, staggered in time, all even places of the multiplicand and result registers will act at once. To bring this about, the sawtooth pulses in the deflector systems of the even places of the multiplicand must be alternated with pauses lasting for an interval of one pulse length, so that during the pause, the group of odd-numbered places of the multiplicand deflector system can operate. For this purpose, in the embodiment being described, the deflector systems of the multiplicand tubes $Rd^n$ are preceded by two sawtooth multivibrators $M^2$ and $M^3$, respectively which in response to impulse groups produce sawtooth pulse groups whose pulse lengths are equal in time to the corresponding pulse intervals. Fig. 1*d* shows a blocking oscillator which transforms the incoming positive impulse (differentiated front flank of the long square impulse) into a sawtooth pulse with a flat ascending flank and a steep descending flank. The effect of this sawtooth pulse is a single sweep of the electron beam, in the corresponding special tube R*r* or R*d*, over the anodes whose conduits are led out of the tube. The length of the flat ascending flank can be varied at will by a corresponding dimensioning of the RC member R1, C1 and the height of the ascending flank can be varied by a corresponding dimensioning of the RC member R2, C2. Yet the arrangement is such that the first ($M_3$) of the two sawtooth multivibrators is swept by the pulses arriving from the multiplier system, and the second ($M_2$) by control pulses taken from the differentiated rear flanks of the sawtooth pulses of the first multivibrator. Hence if all even-numbered places of the multiplicand system are actuated by one multivibrator and all odd-numbered places by the other multivibrator, then the pulse groups formed in the multiplicand system upon multiplication can never simultaneously reach neighboring places of the result register III, but only alternate places, so that decimal carry pulses can hardly ever coincide with direct digital pulses in neighboring places within the result register.

This simple mode of time-staggered computation in the calculator (multiplicand system) and result register of course will not altogether prevent occasional coincidence of an impulse due to decimal carry-over with a direct digital pulse in some decimal place of the result register, namely, for example, when there is an unbroken sequence of 9's in several adjoining places of the result register. In that case a digital pulse accumulating in some place where there is a 9 may cause a carry-over in one or more places following the next, which may then coincide with a direct digital pulse from the calculator. Despite this defect, the arrangement is advantageous because a less frequent coincidence of direct and carried pulses in the same place is easier to deal with technically than a more or less continual coincidence of such pulses in every decade.

A further feature of the invention altogether excludes the coincidence of direct digital pulses with carried pulses.

Figure 3:
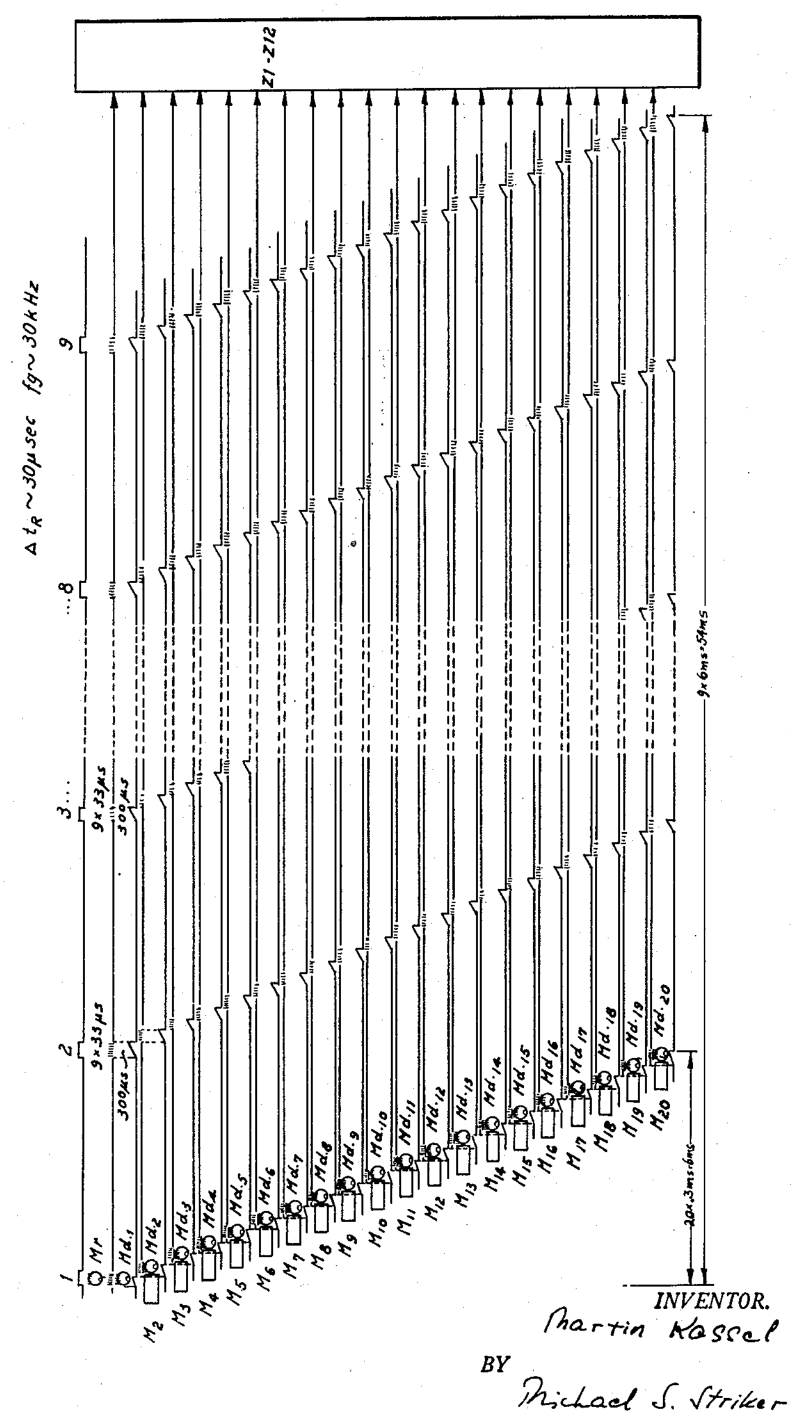
Fig. 3 shows a time diagram.

In the example of a computing time diagram shown in Fig. 3 places of the multiplicand and hence of both the calculator and result registers are scanned in time sequence. The means by which this is accomplished is the same as in the embodiment described above. The sawtooth pulse of each multiplicand deflector tube is differentiated on its rear flank and abuts the sawtooth impulse of the deflector tube in the next place, and so on from the beginning to the end of the chain of multiplicand tubes.

Considering that the total time for processing the multiplicand is doubled by the interlocking process described above, and that each of ten anode sweeps of the multiplier deflection tube R*r* requires complete scanning of all electron-beam deflections in the multiplicand system, it follows that electron-beam deflection in the multiplier tube requires twenty times as much time as electron-beam deflection in a multiplicand tube.

In the second arrangement time-tabled in Fig. 3, the time required for electron-beam deflection of the multiplier tube depends on the maximum possible number of places in the multiplicand, and has been computed and graphically represented for the example of a 20-place multiplicand.

The calculation of the time table proceeds as follows:

$\Delta t_R$=resolving power of result register.

Then $10\Delta t_R$=duration for a group of ten pulses from an $Md^n$ deflector tube.

If $a$=number of decimal places in multiplicands, then $a\cdot 10t_R$=duration of multiplication of an $a$-place multiplicand by the number "1" (one multiplier pulse), and $T_{a,1}=10a\cdot 10\Delta t_R$=duration of multiplication of an $a$-place multiplicand by one tens digit of a multiplier.

For example, when $$\Delta t_R=30 \text{ microseconds}$$

as in result counting with Philips E1T tubes, speed 30 kilocycles, and $a=20$ for 20-place multiplicand, $$T_{a,1}=10\cdot 20\cdot 10\cdot 30 \text{ microseconds}=60 \text{ milliseconds}$$

For 6-place multiplicand, 1-place multiplier and speed 100 kilocycles, $a=6$ and $\Delta t_R=10$ microseconds, yielding $$T_{a,1}=10\cdot 6\cdot 10\cdot 10 \text{ microseconds}=6 \text{ milliseconds}$$

In the last case, with serial automatic machine energy of multiplier, it is possible to calculate a 12-place product (6-place×6-place), for example, in 36 milliseconds:

$$T_{6,6}=6\cdot 10\cdot 6\cdot 10\cdot 10 \text{ microseconds}=36 \text{ milliseconds}$$

So far, only multiplications of a multi-place multiplicand by a one-place multiplier have been described. Multiplication by additional places of a multi-place multiplier can be accomplished in substantially the same manner as described, although provision must be made for the digits of the successive places to be entered in the contact bar M*r* via the single multiplier deflector tube R*r* in time sequence, for example by means of locking keys, whereby a minimum time interval between consecutive actuations of one or of different keys is assured, and for simultaneous decimal shift in the result counter after each contacting which can be accomplished in conventional or in the following manner.

As Figs. 1*a*, 1*b*, 1*c* show, beginning with the multiplier contact bar M*r*, the multivibrator $M_1$ produces the saw tooth pulses for the deflector plates of the multiplier tube R*r*. The multivibrator $M_1$ is constructed in exactly the same way as the parts $M_2$ and $M_3$ which have already been described above in reference to Fig. 1*d*. In addition, a multivibrator $M_4$ generates advance pulses for a set of step-switch tubes $S_1$, $S_2$ for decimal place shift.

Figure 1E:
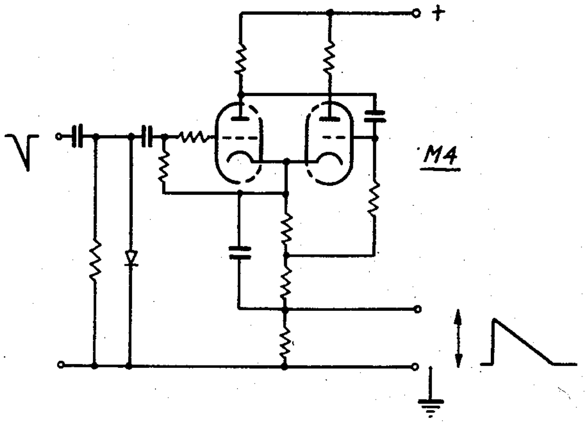

Fig. 1*e* shows the construction of a generator, which, upon receiving a negative impulse being formed by the differentiated rear flank of the long square pulse arriving from the common output line, produces a pulse with a steep ascending flank and with a flat descending flank or long descending time. This pulse places the electron beams of the special tubes $S_1$ to $S_n$ one step further.

For this purpose, each digital contact of the collector bar M*r* of the multiplier deflector tube R*r*, upon opening, is to set up the sawtooth pulse for the deflector plate system of multiplier tube R*r* in the multivibrator $M_1$, and upon closing, produce a pulse in the multivibrator or generator $M_4$ for advancing the decimal place shift by one step. The contacts of the collector bar M*r* are opened by manually operable means, e.g. keys which will open the contacts upon being pressed down and which will be returned to their initial position by spring action when being released.

The digital contacts are in series on the collector bar M*r*. From the ends of this contact bar M*r*, to eliminate parasite recoil pulses, a double line may be led through an accumulating circuit to the input of the monostable multivibrator $M_1$. From the moment of actuation of a digital key of the multiplier, a direct-current sequence is set up ahead of the monostable multivibrator $M_1$ and generator $M_4$. The system is so arranged that the leading flank of the direct-current sequence releases the sawtooth pulse in multivibrator $M_1$ for the deflector system of multiplier tube R*r*, whereas the trailing flank of the direct-current sequence, which occurs upon release of the key and closure of the contact, produces the advance pulse in the generator $M_4$ to effect decimal place shift in the step-switch tube system $S_1$, $S_2$. For reliable and mutually independent accomplishment of these pulse maneuvers, the leading and trailing flanks of the direct-current sequence may be differentiated in the differentiator D. The differentiator members consist each of a lengthwise condenser and a transverse register as illustrated in Figs. 1*a* to 1*c*. Then for example a positive pulse may produce the deflecting sawtooth pulse and a negative pulse the advance pulse, so that no interference can occur.

Each advance pulse occurring at the moment of release of a multiplier key must accomplish a decimal place shift fast enough so that actuation of another multiplier key in the next decimal place will find the result counter ready to receive the pulses for the next decimal place. The advance pulses must accordingly be processed by means of exceptionally rapid rotary selectors, or by electronic counter or selector means.

The embodiment in the circuit diagram of Figs. 1*a* to 1*c*, by way of example, employs an electronic device. The advance pulse, formed in the generator $M_4$ at the moment of release of a multiplier key, advances the electron beams of a set of selector or counter tubes by one step. These tubes—compares Figs. 4 and 5—differ from known counter tubes in that a plurality of anodes (corresponding in number to the stable electron-beam positions) are led out of the tube. As soon as an electron beam in one of its stable positions strikes the corresponding anode, the potential of the latter falls by the voltage drop of the corresponding anode resistance. This applies to every even-numbered anode in the set of decimal shift tubes $S_1$, $S_2$ etc., two of which are shown in Fig. 1*a*. The anodes are so connected with similarly lettered points of diode networks (Fig. 1*c*) ahead of the result registers that the diodes at points A, A′ etc, of tubes $S_1$, $S_2$ etc. become conductive as soon as the electron beams of the decimal shift tubes fall on the similarly lettered anodes A, A′. In the embodiment shown, the pulses of the tens and units place are respectively taken to the inputs of the eleventh and tenth counters of the result register. When, upon release of the multiplier key, for that decimal place, the electron beams of the decimal shift tubes take one more step to anodes B, B′ etc., the diodes at the corresponding points B, B′ will become conductive, and instead of the eleventh and tenth digital place, the pulses will now be routed to the tenth and ninth places of the result register. After entry of the last multiplier place, a key or other signal must return the set of shift tubes back to initial position in known manner.

The sawtooth pulses are generally differentiated on the trailing flank, and the resulting pulse peaks are supplied to the Wehnelt cathode for suppression of beam currents during return.

The oscillator shown in Fig. 1*d* as example for the multi-vibrators $M_1$—$M_3$ is of a known type described e.g. in "Wave Forms" by Chance, Hughes, MacNichol, Sayre and Williams, published 1949 by McGraw-Hill, New York, chapter 7. The generator $M_4$ illustrated by Fig. 1*e* is of the type E1T (counting tube) as described e.g. in "Industrial Electronic Circuits" by Dr. R. Kreutzmann, published 1955 by Philips Technical Library, Eindhoven, Holland (see Figs. 2–16).

Figure 2:
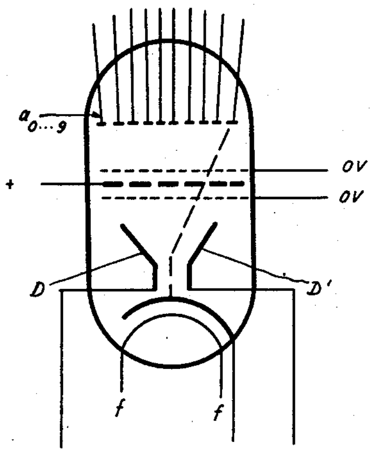
Fig. 2 shows a pulse reproduction tube.

Fig. 2 shows a deflector tube suitable for the pulse reproduction described. It has a cathode heated by a filament and emitting an electron beam which, after passing through focusing and Wehnelt electrodes not shown, and after acceleration by positive potentials, at first impinges on the series of unit anodes $a_0 \ldots a_9$ at the extreme left as long as the field distribution between deflector plates D, D′ leaves the electron beam in left-most angular position. A positive sawtooth or similar deflection potential on the right-hand deflector plate D′ will draw the electron beam to the right over the series of unit anodes $a_0 \ldots a_9$, spotting a negative pulse on each of them.

Figs. 4 and 5 show a novel deflector tube especially suited to step-switch purposes. It differs from known counter tubes in that the individual anodes are each led out of the tube independently. Unlike the continuously operating tube of Fig. 2, it operates in discrete stable positions of the electron beam. The latter is deflected by a pulse on either of the deflector plates D or D′. Starting from "O" position, each single pulse on deflector plate D or D′ advances it preferably one position, so that successive pulses will advance it step-by-step from one output anode to the other output anodes. A Wehnelt electrode serves to keep the electron beam from setting up any undesired circuits on the way back.

What I claim is:

1. A device for converting single electrical pulses into pulse sequences each composed of a predeterminable number of pulses, comprising in combination, high vacuum tube means having a cathoode, a series of independent anodes, and control means for causing an electron beam emitted from said cathode to successively scan said anodes; energizing means for operating said tube means; signal generating means for actuating said control means by injecting an electrical pulse into said control means; and output line means connected to said tube means and comprising at least one output, and circuit means for connecting each of said anodes individually to said output, said circuit means including a plurality of switch means for selectively connecting at least one selected group of said anodes with said output, the number of anodes in such group being selectable between one and up to the total number of said anodes contained in said series thereof, whereby whenever said control means are actuated by a pulse from said signal generating means and said electron beam is caused to successively scan said series of anodes, a pulse sequence is delivered at said output, the number of pulses in such sequence depending upon the number of anodes in said selected group thereof connected with said output by said switch means.

2. A device for converting single electrical pulses into pulse sequences each composed of a predeterminable number of pulses, comprising in combination, high vacuum tube means having a cathode, a series of independent anodes, and control means for causing an electron beam emitted from said cathode to successively scan said anodes; energizing means for operating said tube means; signal generating means for actuating said control means by injecting an electrical pulse into said control means; and output line means connected to said tube means and comprising at least one output, and circuit means for connecting each of said anodes individually to said output, said circuit means including a plurality of switch means arranged in series connection with each other and with at least said one output, and conductor means connecting respectively said anodes with a respective junction point located in said series connection between consecutive switch means thereof and between at least one of said switch means and at least said one output, respectively, for selectively connecting at least one selected group of said anodes with said output, the number of anodes in such group being selectable between one and up to the total number of said anodes contained in said series thereof, whereby whenever said control means are actuated by a pulse from said signal generating means and said electron beam is caused to successively scan said series of anodes, a pulse sequence is delivered at said output, the number of pulses in such sequence depending upon the number of anodes in said selected group thereof connected with said output by said switch means.

3. A device for converting single electrical pulses into pulse sequences each composed of a predeterminable number of pulses, comprising in combination, high vacuum tube means having a cathode, a series of independent anodes, and control means for causing an electron beam emitted from said cathode to successively scan said anodes; energizing means for operating said tube means; signal generating means for actuating said control means by injecting an electrical pulse into said control means; and output line means connected to said tube means and comprising at least one output, and circuit means for connecting each of said anodes individually to said output, said circuit means including a plurality of normally closed switch means arranged in series connection with each other and with at least said one output, and conductor means connecting respectively said anodes with a respective junction point located in said series connection between consecutive switch means thereof and between at least one of said switch means and at least said one output, respectively, for selectively connecting at least one selected group of said anodes with said output by moving a selected one of said switches into open position, the number of anodes in such group being selectable between one and up to the total number of said anodes contained in said series thereof, whereby whenever said control means are actuated by a pulse from said signal generating means and said electron beam is caused to successively scan said series of anodes, a pulse sequence is delivered at said output, the number of pulses in such sequence depending upon the number of anodes in said selected group thereof connected with said output by those switch means located between the opened switch means and said output.

4. A device for converting single electrical pulses into pulse sequences each composed of a predeterminable number of pulses, comprising in combination, high vacuum tube means having a cathode, a series of independent anodes, and control means for causing an electron beam emitted from said cathode to successively scan said anodes; energizing means for operating said tube means; signal generating means for actuating said control means by injecting an electrical pulse into said control means; output line means connected to said tube means and comprising at least one output, and circuit means for connecting each of said anodes individually to said output, said circuit means including a plurality of normally closed switch means arranged in series connection with each other and with at least said one output, and conductor means connecting respectively said anodes with a respective junction point located in said series connection between consecutive switch means thereof and between at least one of said switch means and at least said one output, respectively, for selectively connecting at least one selected group of said anodes with said output by moving a selected one of said switches into open position the number of anodes in such group being selectable between one and up to the total number of said anodes contained in said series thereof; and manually operable actuating means for selectively moving any one of said switch means into open position, whereby whenever said control means are actuated by a pulse from said signal generating means and said electron beam is caused to successively scan said series of anodes, a pulse sequence is delivered at said output, the number of pulses in such sequence depending upon the number of anodes in said selected group thereof connected with said output by those switch means located between the opened switch means and said output.

5. A device for converting single electrical pulses into pulse sequences each composed of a predeterminable number of pulses, comprising in combination, high vacuum tube means having a cathode, a series of independent anodes, and control means for causing an electron beam emitted from said cathode to successively scan said anodes; energizing means for operating said tube means; signal generating means for actuating said control means by injecting an electrical pulse into said control means; and output line means connected to said tube means and comprising two outputs, and circuit means for connecting each of said anodes individually and selectively to either one of said outputs, said circuit means including a plurality of switch means arranged in series connection with each other between said outputs, with a first switch directly connected to one of said outputs, and a last switch directly connected to the other one of said outputs, and conductor means connecting respectively said anodes with a respective junction point located in said series connection between consecutive switch means thereof and between said first switch and said one output, and between said last switch and said other output, respectively, for selectively connecting one selected group of said anodes with said one output, and another selected group with said other output, the number of anodes in each such group being selectable between one and up to the total number of said anodes contained in said series thereof, whereby whenever said control means are actuated by a pulse from said signal generating means and said electron beam is caused to successively scan said series of anodes, a pulse sequence is delivered at each of said two outputs, the number of pulses in such sequence depending upon the number of anodes in said selected group thereof connected with each of said two outputs by said switch means.

6. A device for converting single electrical pulses into pulse sequences each composed of a predeterminable number of pulses, comprising in combination, high vacuum tube means having a cathode, a series of independent anodes, and control means for causing an electron beam emitted from said cathode to successively scan said anodes; energizing means for operating said tube means; signal generating means for actuating said control means by injecting an electrical pulse into said control means; and output line means connected to said tube means and comprising two outputs, and circuit means for connecting each of said anodes individually and selectively to either one of said outputs, said circuit means including a plurality of normally closed switch means arranged in series connection with each other between said outputs, with a first switch directly connected to one of said outputs, and a last switch directly connected to the other one of said outputs, and conductor means connecting respectively said anodes with a respective junction point located in said series connection between consecutive switch means thereof and between said first switch and said one output, and between said last switch and said other output, respectively, for selectively connecting one selected group of said anodes with said one output, and another selected group with said other output by moving a selected one of said switches into open position, the number of anodes in each such group being selectable between one and up to the total number of said anodes contained in said series thereof, whereby whenever said control means are actuated by a pulse from said signal generating means and said electron beam is caused to successively scan said series of anodes, a pulse sequence is delivered at each of said two outputs, the number of pulses in such sequence depending upon the number of anodes in said selected group thereof connected with each of said two outputs by those switch means located between the opened switch means and said two outputs, respectively.

7. A device for converting single electrical pulses into pulse sequences each composed of a predeterminable number of pulses, comprising in combination, high vacuum tube means having a cathode, a series of independent anodes, and control means for causing an electron beam emitted from said cathode to successively scan said anodes; energizing means for operating said tube means; signal generating means for actuating said control means by injecting an electrical pulse into said control means; output line means connected to said tube means and comprising two outputs, and circuit means for connecting each of said anodes individually and selectively to either one of said outputs, said circuit means including a plurality of normally closed switch means arranged in series connection with each other between said outputs, with a first switch directly connected to one of said outputs, and a last switch directly connected to the other one of said outputs, and conductor means connecting respectively said anodes with a respective junction point located in said series connection between consecutive switch means thereof and between said first switch and said one output, and between said last switch and said other output, respectively, for selectively connecting one selected group of said anodes with said one output, and another selected group with said other output by moving a selected one of said switches into open position, the number of anodes in each such group being selectable between one and up to the total number of said anodes contained in said series thereof; and manually operable actuating means for selectively moving any one of said switch means into open position, whereby whenever said control means are actuated by a pulse from said signal generating means and said electron beam is caused to sucessively scan said series of anodes, a pulse sequence is delivered at each of said two outputs, the number of pulses in such sequence depending upon the number of anodes in said selected group thereof connected with each of said two outputs by those switch means located between the opened switch means and said two outputs, respectively.

8. In an electronic computer, in combination, high vacuum tube means having a cathode, a series of independent anodes, and control means for causing an electron beam emitted from said cathode to successively scan said anodes; energizing means for operating said tube means; pulse generating means for actuating said control means by sequentially injecting at least one electrical pulse per injection into said control means, the number of pulses representing a multiplier; and output line means connected to said tube means and comprising at least one output, and circuit means for connecting each of said anodes individually to said output, said circuit means including a plurality of switch means for selectively connecting at least one selected group of said anodes with said output, the number of anodes in such group representing a multiplicand and being selectable between one and up to the total number of said anodes contained in said series thereof, whereby when a selected number of said anodes corresponding to a multiplicand is connected by said switch means to said output, and if then a number of pulses corresponding to a multiplier is injected from said pulse generating means into said control means, to cause said electron beam to successively scan said series of anodes, a pulse sequence is delivered at said output, the number of said pulses contained in such sequence representing the product of said multiplier and said multiplicand.

9. In an electronic computer, in combination, high vacuum tube means having a cathode, a series of independent anodes, and control means for causing an electron beam emitted from said cathode to successively scan said anodes; energizing means for operating said tube means; pulse generating means for actuating said control means by sequentially injecting at least one electrical pulse per injection into said control means, the number of pulses representing a multiplier; and output line means connected to said tube means and comprising at least one output, and circuit means for connecting each of said anodes individually to said output, said circuit means including a plurality of switch means arranged in series connection with each other and with at least said one output, and conductor means connecting respectively said anodes with a respective junction point located in said series connection between consecutive switch means thereof and between at least one of said switch means and at least said one output, respectively, for selectively connecting at least one selected group of said anodes with said output, the number of anodes in such group representing a multiplicand and being selectable between one and up to the total number of said anodes contained in said series thereof, whereby when a selected number of said anodes corresponding to a multiplicand is connected by said switch means to said output, and if then a number of pulses corresponding to a multiplier is injected from said pulse generating means into said control means, to cause said electron beam to successively scan said series of anodes, a pulse sequence is delivered at said output, the number of said pulses contained in such sequence representing the product of said multiplier and said multiplicand.

10. In an electronic computer, in combination, high vacuum tube means having a cathode, a series of independent anodes, and control means for causing an electron beam emitted from said cathode to successively scan said anodes; energizing means for operating said tube means; pulse generating means for actuating said control means by sequentially injecting at least one electrical pulse per injection into said control means, the number of pulses representing a multiplier; and output line means connected to said tube means and comprising at least one output, and circuit means for connecting each of said anodes individually to said output, said circuit means including a plurality of normally closed switch means arranged in series connection with each other and with at least said one output, and conductor means connecting respectively said anodes with a respective junction point located in said series connection between consecutive switch means thereof and between at least one of said switch means and at least said one output, respectively, for selectively connecting at least one selected group of said anodes with said output by moving a selected one of said switches into open position, the number of anodes in such group representing a multiplicand and being selectable between one and up to the total number of said anodes contained in said series thereof, whereby when a selected number of said anodes corresponding to a multiplicand is connected by said switch means to said output, and if then a number of pulses corresponding to a multiplier is injected from said pulse generating means into said control means, to cause said electron beam to successively scan said series of anodes, a pulse sequence is delivered at said output, the number of said pulses contained in such sequence representing the product of said multiplier and said multiplicand.

11. In an electronic computer, in combination, high vacuum tube means having a cathode, a series of independent anodes, and control means for causing an electron beam emitted from said cathode to successively scan said anodes; energizing means for operating said tube means; pulse generating means for actuating said control means by sequentially injecting at least one electrical pulse per injection into said control means, the number of pulses representing a multiplier; output line means connected to said tube means and comprising at least one output, and circuit means for connecting each of said anodes individually to said output, said circuit means including a plurality of normally closed switch means arranged in series connection with each other and with at least said one output, and conductor means connecting respectively said anodes with a respective junction point located in said series connection between consecutive switch means thereof and between at least one of said switch means and at least said one output, respectively, for selectively connecting at least one selected group of said anodes with said output by moving a selected one of said switches into open position, the number of anodes in such group representing a multiplicand and being selectable between one and up to the total number of said anodes contained in said series thereof; and manually operable actuating means for selectively moving any one of said switch means into open position, whereby when a selected number of said anodes corresponding to a multiplicand is connected by said switch means to said output, and if then a number of pulses corresponding to a multiplier is injected from said pulse generating means into said control means, to cause said electron beam to successively scan said series of anodes, a pulse sequence is delivered at said output, the number of said pulses contained in such sequence representing the product of said multiplier and said multiplicand.

12. In an electronic computer, in combination, a first high vacuum tube means having a cathode, a series of independent anodes, and control means for causing an electron beam emitted from said cathode to successively scan said anodes; at least one second high vacuum tube means having a cathode, a series of independent anodes, and control means for causing an electron beam emitted from its cathode to successively scan said anodes thereof; energizing means for operating said tube means; pulse generating means for actuating said control means of said first vacuum tube means by injecting at least one electrical pulse per injection into said last-mentioned control means; first output line means connected to said first tube means and comprising at least one first output, and first circuit means for connecting each of said anodes of said first vacuum tube means individually to said first output, said first circuit means including a plurality of first switch means for selectively connecting at least one selected group of said anodes of said first vacuum tube means with said first output, the number of anodes in such group representing a multiplier and being selectable between one and up to the total number of said anodes contained in said series thereof; second output line means connected to said second tube means and comprising at least one second output, and second circuit means for connecting each of said anodes of said second tube means individually to said second output, said second circuit means including a plurality of second switch means for selectively connecting at least one selected group of said anodes of said second tube means with said second output, the number of anodes in such group representing a multiplicand and being selectable between one and up to the total number of said anodes contained in said series thereof in said second tube means; and connecting circuit means connecting said first output of said first output line means with said control means of said second tube means for injecting pulses appearing at said first output into said control means of said second tube means, whereby when a selected number of said anodes corresponding to a multiplicand of said second tube means is connected by said second switch means to said second output, and if a selected number of said anodes corresponding to a multiplier of said first tube means is connected by said first switch means to said first output, and if then a single pulse is injected from said pulse generating means into said control means of said first tube means, a first pulse sequence is delivered at said first output, the number of pulses in said first sequence representing the multiplier, so that said second tube means is caused to deliver at said second output a plurality of second sequences of pulses, the number of said second sequences being equal to the number of pulses in said first sequence representing the multiplier, and the number of pulses in each second sequence representing the multiplicand, the total number of pulses appearing at said second output representing the product of said multiplier and said multiplicand.

13. An electronic computer as set forth in claim 12, having a plurality of said second tube means and a corresponding number of said second output line means respectively associated therewith, and wherein said connecting circuit means connect said first output means with the control means of all of said second tube means, said individual second tube means and associated second output line means being respectively assigned to different orders of the multiplicand, so that in operation the digits in all the different orders of the multiplicand are multiplied by the multiplier.

14. An electronic computer as set forth in claim 13, including totalizing means connected to said plurality of second output line means for adding up the numbers of pulses contained in said second sequences of pulses appearing at said second outputs of all of said second output lines upon the injection of said single pulse into said control means of said first tube means.

15. An electronic computer as set forth in claim 14, wherein in each of said output line means said switch means are arranged in series connection with each other and with at least said one output thereof, and conductor means respectively connect said anodes of a pertaining tube means with a respective junction point located in said series connection between consecutive switch means thereof and between at least one of said switch means and at least said one output, respectively.

16. An electronic computer as set forth in claim 15, wherein said switch means are normally closed switch means for selectively connecting at least one selected group of said anodes with said one output by moving a selected one of said switch means into open position.

17. An electronic computer as set forth in claim 16, including manually operable actuating means for selectively moving any one of said switch means of any one of said output line means into open position.

References Cited in the file of this patent

UNITED STATES PATENTS

| | | |
|---|---|---|
| 2,442,428 | Mumma | June 1, 1948 |
| 2,457,911 | Munster | Jan. 4, 1949 |
| 2,483,400 | Clark | Oct. 4, 1949 |
| 2,616,060 | Goodall | Oct. 28, 1952 |
| 2,661,899 | Chromy et al. | Dec. 8, 1953 |
| 2,700,503 | Crosman | Jan. 25, 1955 |
| 2,812,133 | McMillan | Nov. 5, 1957 |
| 2,817,477 | Williams | Dec. 24, 1957 |

FOREIGN PATENTS

| | | |
|---|---|---|
| 158,056 | Australia | Aug. 4, 1954 |

OTHER REFERENCES

Overbeek, et al.: A Decade Counter Tube for High Counting Rates, Philips Technical Review, vol. 14, No. 11, May 1953 (pp. 313–326).